US012481964B2

(12) United States Patent
Sahoo et al.

(10) Patent No.: US 12,481,964 B2
(45) Date of Patent: Nov. 25, 2025

(54) MACHINE LEARNING BASED CONTACT TIME RECOMMENDATION ENGINE

(71) Applicant: HIGHRADIUS CORPORATION, Houston, TX (US)

(72) Inventors: Dibya Prakash Sahoo, Hyderabad (IN); Manish Kumar Choudhary, Hyderabad (IN); Liza Mohanty, Hyderabad (IN); Abhishek Sahu, Hyderabad (IN); Pratyush Sunandan, Hyderabad (IN); Abhinav Pachauri, Hyderabad (IN); Sonali Nanda, Hyderabad (IN); Upamanyu Sarangi, Hyderabad (IN); Biplav Adhikary, Hyderabad (IN)

(73) Assignee: HIGHRADIUS CORPORATION, TX (US)

( * ) Notice: Subject to any disclaimer, the term of this patent is extended or adjusted under 35 U.S.C. 154(b) by 133 days.

(21) Appl. No.: 18/516,972

(22) Filed: Nov. 22, 2023

(65) Prior Publication Data
US 2025/0165931 A1    May 22, 2025

(51) Int. Cl.
  *G06Q 10/06*     (2023.01)
  *G06Q 10/04*     (2023.01)
  *G06Q 10/1093*   (2023.01)
  *G06Q 40/03*     (2023.01)

(52) U.S. Cl.
  CPC ........ *G06Q 10/1093* (2013.01); *G06Q 10/04* (2013.01); *G06Q 40/03* (2023.01)

(58) Field of Classification Search
  CPC ..................................................... G06Q 10/10
  USPC ........................................................ 705/7.19
  See application file for complete search history.

(56) References Cited

U.S. PATENT DOCUMENTS

| | | | |
|---|---|---|---|
| 9,762,733 B1* | 9/2017 | Ramanujaiaha | H04M 3/42068 |
| 2017/0178080 A1* | 6/2017 | Abebe | G06F 16/383 |
| 2019/0114569 A1* | 4/2019 | Palmer, II | G06N 3/006 |
| 2020/0134759 A1* | 4/2020 | Refila | G06Q 50/2053 |
| 2023/0308545 A1* | 9/2023 | DiMaria | H04L 65/1096 |
| 2024/0073108 A1* | 2/2024 | Clark | H04L 41/5074 |
| 2025/0165439 A1* | 5/2025 | Sutariya | G06N 7/01 |

* cited by examiner

*Primary Examiner* — Nga B Nguyen
(74) *Attorney, Agent, or Firm* — Jason C. Cameron

(57) ABSTRACT

A machine learning based computing method for computing optimal contact times for contacting first users including debtors, is disclosed. The machine learning based computing method includes: receiving inputs from second users including debt collectors; extracting data associated with the first users and the second users from databases, based on the inputs received from the second users; computing contact feature scores based on the extracted data associated with the first users and the second users, for each specified interval of a contact prediction window; computing first user call scores for each specified interval of the contact prediction window based on the contact feature scores for each specified interval of the contact prediction window, using a machine learning model; and computing the optimal contact times and a prioritized list of the optimal contact times by ranking each specified interval of the contact prediction window associated with the first user call scores.

20 Claims, 6 Drawing Sheets

MACHINE LEARNING BASED CONTACT TIME RECOMMENDATION ENGINE

FIELD OF INVENTION

Embodiments of the present disclosure relate to machine learning based (ML-based) computing systems, and more particularly relates to a ML-based computing method and system for computing one or more optimal contact times to communicate with first one or more users (e.g., debtors or customers).

BACKGROUND

Debt collection is a process of recovering outstanding payments owed to a creditor. When debt collectors engage in this process, the debt collectors employ one or more techniques to establish contact with and convince debtors to settle their outstanding obligations. The one or more techniques may include at least one of: making phone calls, conducting video conferences, sending letters, and using electronic communication channels including at least one of: emails and text messages. Among the one or more techniques used by the debt collectors for contacting the debtors, the phone calls and the video calls remain one of the most effective techniques for recovery of debts due to following reasons.

Personal Touch: Utilizing both phone calls and video calls enhances a human aspect of a debt collection procedure, providing a personal touch. This approach humanizes an interaction and enables the debt collectors to establish a relationship with the debtors. The act of building a personal connection can heighten the chances of productive negotiations and motivate the debtors to take requisite actions to meet their financial commitments.

Customized Approach: The debt collectors can gain deeper insights into debtors' financial situations, evaluate their capacity to make payments, and explore tailored repayment solutions that align with their unique requirements. The customized approach has the potential to result in more effective and successful debt resolutions.

Last Resort Before Legal Action: Ultimately, both phone calls and video calls frequently represent a final process to retrieve an outstanding debt before considering legal measures. During this contact, the debt collectors can underscore the possible repercussions of non-payment, including at least one of: legal proceedings, adverse effects on credit scores, and involvement of collection agencies. This reminder can serve as a catalyst for the debtors to prioritize settling the debt and taking essential steps to avoid additional complications.

Typically, the debt collectors utilize one or more below methods to determine an optimal time to communicate with the debtors in a context of the outstanding debts.

Historical Data Analysis: The debt collectors often examine historical data to detect at least one of: recurring patterns and trends, that indicates specific times of a day or days of a week when the debtors are more accessible or responsive. This valuable insight allows the debt collectors to strategically plan for the phone or video calls during these identified periods.

Debtor Contact Preferences: The debt collectors have an option to collect data on debtors' favoured contact methods and preferred contact times for communication. The data can be acquired through at least one of: prior interactions and by directly inquiring with the debtors. Subsequently, the debt collectors can arrange calls according to the preferred contact times gathered from the data.

Individual Debtor Analysis: The debt collectors may assess an individual debtor's behavior and payment patterns to determine the optimal time for reaching out to the debtors. This assessment takes into account factors including at least one of: debtor's historical payment track record, frequency of past delinquencies, and debtor's responsiveness to prior communications.

Even though the above said methods are effective in determining the optimal time to communicate with the debtors, there are potential drawbacks as given below.

Subjectivity and Limited Data: Examining the historical data and considering the debtor contact preferences can offer valuable insights, but they may not always precisely forecast debtor actions. Debtor's situations and accessibility can evolve with time, and relying solely on the historical data or the subjective debtor contact preferences might not consistently deliver reliable outcomes.

Variability in Debtor Behavior: Every debtor possesses distinct qualities, and their actions and preferences can differ significantly. Approaches that prove effective with one debtor may not yield the same results with another debtor. The debt collectors must take into account at least one of: individual circumstances, encompassing financial conditions, personal obligations, and communication inclinations. Accurately capturing the above said factors can present a considerable challenge.

Debtor Perception and Trust: At least one of: frequent and poorly timed communication can result in debtor annoyance, potentially diminishing their willingness to collaborate with the debt collectors and fulfil their financial obligations. Striking a balance between the imperative of debt collection, preserving favourable debtor relationships, and trust, is of utmost importance.

Hence, there is a need for an improved machine learning based (ML-based) computing system, i.e., a contact time recommendation engine, and method for computing one or more optimal contact times to communicate with first one or more users, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) computing method for computing one or more optimal contact times to communicate with a first one or more users, is disclosed. The ML-based computing method includes receiving, by one or more hardware processors, one or more inputs from a second one or more users. The one or more inputs comprises information related to at least one of: one or more entities associated with the first one or more users, and a contact prediction window associated with a predefined time duration during which the second one or more users requires an optimal instance for a communication with the first one or more users.

The ML-based computing method further includes extracting, by the one or more hardware processors, one or more data associated with the first one or more users and the second one or more users from one or more databases, based on the one or more inputs received from the second one or more users.

The ML-based computing method further includes computing, by the one or more hardware processors, one or more contact feature scores based on the extracted one or more data associated with the first one or more users and the second one or more users, for each specified interval of the contact prediction window. The one or more contact feature scores comprises at least one of: incoming call score at each specified interval, first user call preference score, call productive rate score, quarterly call productivity score, and second user call preference score.

The ML-based computing method further includes computing, by the one or more hardware processors, one or more first user call scores for each specified interval of the contact prediction window based on the one or more contact feature scores for each specified interval of the contact prediction window, using a machine learning model.

The ML-based computing method further includes computing, by the one or more hardware processors, at least one of: the one or more optimal contact times and a prioritized list of the one or more optimal contact times by ranking each specified interval of the contact prediction window associated with the one or more first user call scores. In a non-limiting embodiment, each specified interval comprises at least one of: 30 minutes, one-hour, two-hours, and the like.

The ML-based computing method further includes providing, by the one or more hardware processors, an output of at least one of the one or more optimal contact times and the prioritized list of the one or more optimal contact times to the second one or more users on an user interface associated with one or more electronic devices.

The ML-based computing method further communicating, by the one or more hardware processors, with the first one or more users by scheduling one or more calls with the first one or more users during the one or more optimal contact times.

In an embodiment, the first one or more users comprises at least one of: one or more debtors, one or more customers, one or more organizations, an individual within one or more organizations, one or more parent companies, one or more subsidiaries, one or more joint ventures, one or more partnerships, and one or more legal entities. In some embodiments, the first one or more users owes at least one of: a financial obligation, liability, and debt. The second one or more users comprises at least one of: one or more data analysts, one or more business analysts, one or more cash analysts, one or more financial analysts, one or more collection analysts, one or more debt collectors, and one or more professionals associated with cash and collection management.

In another embodiment, the one or more data associated with the first one or more users comprise at least one of: first one or more identifiers corresponding to the first one or more users, one or more timestamps of one or more incoming calls, one or more timestamps of one or more outgoing calls, one or more time durations of at least one of: the one or more incoming calls and the one or more outgoing calls, one or more notes associated with at least one of: the one or more incoming calls and the one or more outgoing calls, one or more timestamps of one or more interactions with the first one or more users throughout a quarter time period, one or more timestamps of one or more incoming emails, a nature of a day comprising at least one of: a weekend, a working day, and a holiday. The one or more data associated with the second one or more users comprise at least one of: second one or more identifiers corresponding to the second one or more users occupied in call activities with the first one or more users, and one or more timestamps when each second user is occupied in the call activities with the first one or more users.

In yet another embodiment, computing the one or more contact feature scores for each specified interval of the contact prediction window, comprises (a) computing, by the one or more hardware processors, the incoming call score at each specified interval by dividing a count of the one or more incoming calls received from the first one or more users during an specified interval by cumulative one or more incoming calls received from the first one or more users throughout a day, (b) computing, by the one or more hardware processors, the first user call preference score by determining a percentage of the one or more incoming calls received from the first one or more users out of a total of the one or more incoming calls and the one or more incoming emails for each specified interval of the first one or more users, (c) computing, by the one or more hardware processors, the call productive rate score by dividing a count of the one or more outgoing calls reaching productivity call criteria by a total number of the one or more outgoing calls, (d) computing, by the one or more hardware processors, the quarterly call productivity score, (e) computing, by the one or more hardware processors, the second user call preference score. The productivity call criteria is associated with at least one of: a duration of one or more conversation calls between the first one or more users and the second one or more users exceeds at least a predetermined length of time and the one or more conversation calls is supported by one or more system-recorded notes comprising relevant actions. In certain embodiments, the predetermined length of time comprises at least one of: 5 seconds, 10 seconds, and the like.

In yet another embodiment, computing, by the one or more hardware processors, the quarterly call productivity score, comprises (a) computing, by the one or more hardware processors, one or more individual call productive rate scores from one or more productive communications between the first one or more users and the second one or more users, occurred at a plurality of times of each day throughout the quarter time period, (b) aggregating, by the one or more hardware processors, the one or more individual call productive rate scores, and (c) dividing, by the one or more hardware processors, the aggregated one or more individual call productive rate scores by a total count of the one or more individual call productive rate scores to compute the quarterly call productivity score.

In yet another embodiment, computing, by the one or more hardware processors, the second user call preference score, comprises (a) aggregating, by the one or more hardware processors, second one or more individual call productive rate scores associated with each user of the second one or more users occupied in the call activities with the first one or more users within an specified interval, and (b) dividing, by the one or more hardware processors, the aggregated second one or more individual call productive rate scores by a total count of the second one or more users occupied in the call activities with the first one or more users during the specified interval, to compute the second user call preference score.

In yet another embodiment, computing, using the machine learning model, the one or more first user call scores for each specified interval of the contact prediction window based on the one or more contact feature scores, comprises (a) determining, by the one or more hardware processors, one or more weightages for each contact feature score of the one or more contact feature scores using the machine learning model, (b) assigning, by the one or more hardware processors, the determined one or more weightages to the one or more contact feature scores, and (c) aggregating, by the one or more hardware processors, the assigned one or more weightages to the one or more contact feature scores to compute the one or more first user call scores for each specified interval of the contact prediction window. The machine learning model comprises a gradient descent based machine learning model.

In yet another embodiment, the ML-based computing method further comprises training, by the one or more hardware processors, the machine learning model by at least one of: (a) receiving, by the one or more hardware processors, one or more training datasets associated with the one or more contact feature scores, from a contact feature score computing subsystem, (b) performing, by the one or more hardware processors, forward passes with one or more initial weightages by processing one or more training datasets associated with the one or more contact feature scores, through the machine learning model to compute the one or more first user call scores for each specified interval of the contact prediction window, (c) executing, by the one or more hardware processors, one or more loss functions comprising at least one of: mean squared error and mean absolute error to determine a difference between the computed one or more first user call scores and actual one or more first user call scores, (d) computing, by the one or more hardware processors, gradient of one or more losses for the one or more initial weightages of each contact feature score of the one or more contact feature scores, (e) updating, by the one or more hardware processors, the one or more initial weightages of each contact feature score of the one or more contact feature scores based on the gradient of one or more losses and a learning rate, (f) repeating, by the one or more hardware processors, a process of at least of: performance of the forward passes, the computation of the gradient of one or more losses, updating of the one or more initial weightages, until convergence is achieved, and the convergence is achieved when the one or more losses is reduced, and (g) determining, by the one or more hardware processors, the one or more weightages of each contact feature score of the one or more contact feature scores for the one or more parameters of the machine learning model. The learning rate is determined at a time of training the machine learning model. The learning rate is a hyperparameter in a context of one or more gradient descent rules for training the machine learning model.

In yet another embodiment, the ML-based computing method further comprises validating, by the one or more hardware processors, the machine learning model based on one or more validation datasets. In an embodiment, validating the machine learning model comprises determining, by the one or more hardware processors, whether the machine learning model is trained until the one or more losses reaches a stable state indicating the achieved convergence.

In yet another embodiment, the ML-based computing method further comprises re-training, by the one or more hardware processors, the machine learning model over a plurality of time intervals based on one or more training data. In an embodiment, re-training the machine learning model over the plurality of time intervals comprises (a) receiving, by the one or more hardware processors, the one or more training data associated with at least one of: the one or more optimal contact times and the prioritized list of the one or more optimal contact times, from an output subsystem, (b) adding, by the one or more hardware processors, the one or more training data with the one or more training datasets to generate one or more updated training datasets comprising at least one of: first one or more data points and second one or more data points, (c) re-training, by the one or more hardware processors, the machine learning model to update the one or more weightages by performing the process of at least one of: the performance of the forward passes, the computation of the gradient of one or more losses, updating of the one or more initial weightages, until convergence is achieved, and (d) executing, by the one or more hardware processors, the re-trained machine learning model in a first user call score computing subsystem to compute the one or more first user call scores for each specified interval of the contact prediction window over the plurality of time intervals.

In yet another embodiment, the one or more data associated with the first one or more users and the second one or more users, are extracted from the one or more databases based on one or more techniques comprising at least one of: data normalization, data anonymization, data aggregation, data analysis, and data storage. The one or more databases comprises at least one of: one or more relational databases, one or more object-oriented databases, one or more data warehouses, and one or more cloud-based databases.

In one aspect, a machine learning based (ML-based) computing system for computing one or more optimal contact times to communicate with a first one or more users, is disclosed. The ML-based computing system, i.e., a contact time recommendation engine, includes one or more hardware processors and a memory coupled to the one or more hardware processors. The memory includes a plurality of subsystems in the form of programmable instructions executable by the one or more hardware processors.

The plurality of subsystems includes a data receiving subsystem configured to receive one or more inputs from a second one or more users. The one or more inputs include information related to at least one of: one or more entities associated with the first one or more users and a contact prediction window is associated with a predefined time duration during which the second one or more users requires an optimal instance for a communication with the first one or more users.

The plurality of subsystems further includes a data extraction subsystem configured to extract one or more data associated with the first one or more users and the second one or more users from one or more databases, based on the one or more inputs received from the second one or more users.

The plurality of subsystems further includes a contact feature score computing subsystem configured to compute one or more contact feature scores based on the extracted one or more data associated with the first one or more users and the second one or more users, for each specified interval of the contact prediction window. The one or more contact feature scores comprises at least one of: incoming call score at each specified interval, first user call preference score, call productive rate score, quarterly call productivity score, and second user call preference score.

The plurality of subsystems further includes a first user call score computing subsystem configured to compute one or more first user call scores for each specified interval of the contact prediction window based on the one or more contact feature scores for each specified interval of the contact prediction window, using a machine learning model.

The plurality of subsystems further includes an optimal contact time computing subsystem configured to compute at least one of: the one or more optimal contact times and a prioritized list of the one or more optimal contact times by ranking each specified interval of the contact prediction window associated with the one or more first user call scores. In a non-limiting embodiment, each specified interval comprises at least one of: 30 minutes, one-hour, and two-hours.

The plurality of subsystems further includes an output subsystem configured to provide an output of at least one of the one or more optimal contact times and the prioritized list of the one or more optimal contact times to the second one or more users on an user interface associated with one or more electronic devices.

The plurality of subsystems further includes a call scheduler subsystem configured to communicate with the first one or more users by scheduling one or more calls with the first one or more users during the one or more optimal contact times.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
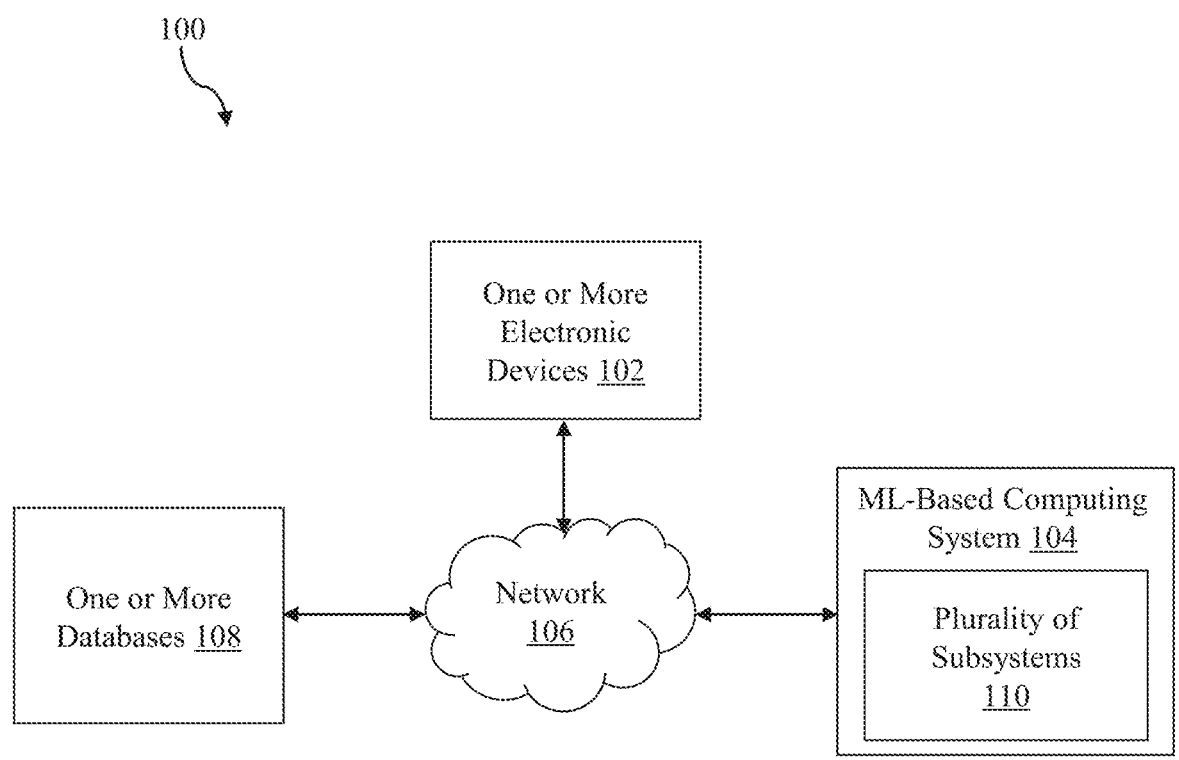
FIG. 1 is a block diagram illustrating a computing environment with a machine learning based (ML-based) computing system, i.e., a contact time recommendation engine, for computing one or more optimal contact times to communicate with a first one or more users, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) computing system 104 for computing one or more optimal contact times to communicate with a first one or more users, in accordance with an embodiment of the present disclosure. In certain embodiments, the ML-based computing system 104 is a contact time recommendation engine. According to FIG. 1, the computing environment 100 includes one or more electronic devices 102 that are communicatively coupled to the ML-based computing system 104 through a network 106. The one or more electronic devices 102 through which second one or more users provide one or more inputs to the ML-based computing system 104. In an embodiment, the first one or more users may include at least one of: one or more debtors, one or more customers, one or more organizations, an individual within the one or more organizations, one or more parent companies, one or more subsidiaries, one or more joint ventures, one or more partnerships, and one or more legal entities. In some embodiments, the first one or more users owes at least one of: a financial obligation, liability, debt, and the like. In another embodiment, the one or more legal entities may include at least one of: one or more corporations, one or more partnerships, one or more governmental bodies, one or more associations, and the like.

In an embodiment, the second one or more users may include at least one of: one or more data analysts, one or more business analysts, one or more cash analysts, one or more financial analysts, one or more collection analysts, one or more debt collectors, one or more professionals associated with a cash and collection management, and the like.

The present invention is configured to compute the one or more one or more optimal contact times to communicate with the first one or more users. The ML-based computing system 104 is initially configured to receive one or more inputs from the second one or more users. In an embodiment, the one or more inputs includes information related to at least one of: one or more entities associated with the first one or more users and a contact prediction window. The contact prediction window (i.e., a prediction window) represents a predefined time duration during which the second one or more users require an optimal instance for a communication with the first one or more users.

The ML-based computing system 104 is further configured to extract one or more data associated with the first one or more users and the second one or more users from one or more databases 108, based on the one or more inputs received from the second one or more users. The ML-based computing system 104 is further configured to compute one or more contact feature scores based on the extracted one or more data associated with the first one or more users and the second one or more users, for each specified interval of the contact prediction window. The one or more contact feature scores includes at least one of: incoming call (IC) score at each specified interval, first user call preference (CP) score (i.e., customer call preference (CP) score), call productive rate (CPR) scores, quarterly call productivity (QCP) score, and second user call preference score (i.e., collector's call preference (CoCP) score).

The ML-based computing system 104 is further configured to compute one or more first user call scores (i.e., one or more customer call scores) for each specified interval of the contact prediction window based on the one or more contact feature scores for each specified interval of the contact prediction window, using a machine learning model.

The ML-based computing system 104 is further configured to compute at least one of: the one or more optimal contact times and a prioritized list of the one or more optimal contact times by ranking each specified interval of the contact prediction window associated with the one or more first user call scores. In an embodiment, each specified interval comprises at least one of: 30 minutes, one-hour, two-hours, and the like.

The ML-based computing system 104 is further configured to provide an output of at least one of: the one or more optimal contact times and the prioritized list of the one or more optimal contact times to the second one or more users on an user interface associated with the one or more electronic devices 102. The ML-based computing system 104 is further configured to communicate with the first one or more users by scheduling one or more calls with the first one or more users during the one or more optimal contact times.

The ML-based computing system 104 may be hosted on a central server including at least one of: a cloud server or a remote server. Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smartphone, a wearable device, a Smart watch, and the like.

Further, the computing environment 100 includes the one or more databases 108 communicatively coupled to the ML-based computing system 104 through the network 106. In an embodiment, the one or more databases 108 includes at least one of: one or more relational databases, one or more object-oriented databases, one or more data warehouses, one or more cloud-based databases, and the like. In another embodiment, a format of the one or more data generated from the one or more databases 108 may include at least one of: a comma-separated values (CSV) format, a JavaScript Object Notation (JSON) format, an Extensible Markup Language (XML), spreadsheets, and the like. Furthermore, the one or more electronic devices 102 include at least one of: a local browser, a mobile application, and the like. Furthermore, the second one or more users may use a web application through the local browser, the mobile application to communicate with the ML-based computing system 104. In an embodiment of the present disclosure, the ML-based computing system 104 includes a plurality of subsystems 110. Details on the plurality of subsystems 110 have been elaborated in subsequent paragraphs of the present description with reference to FIG. 2.

Figure 2:
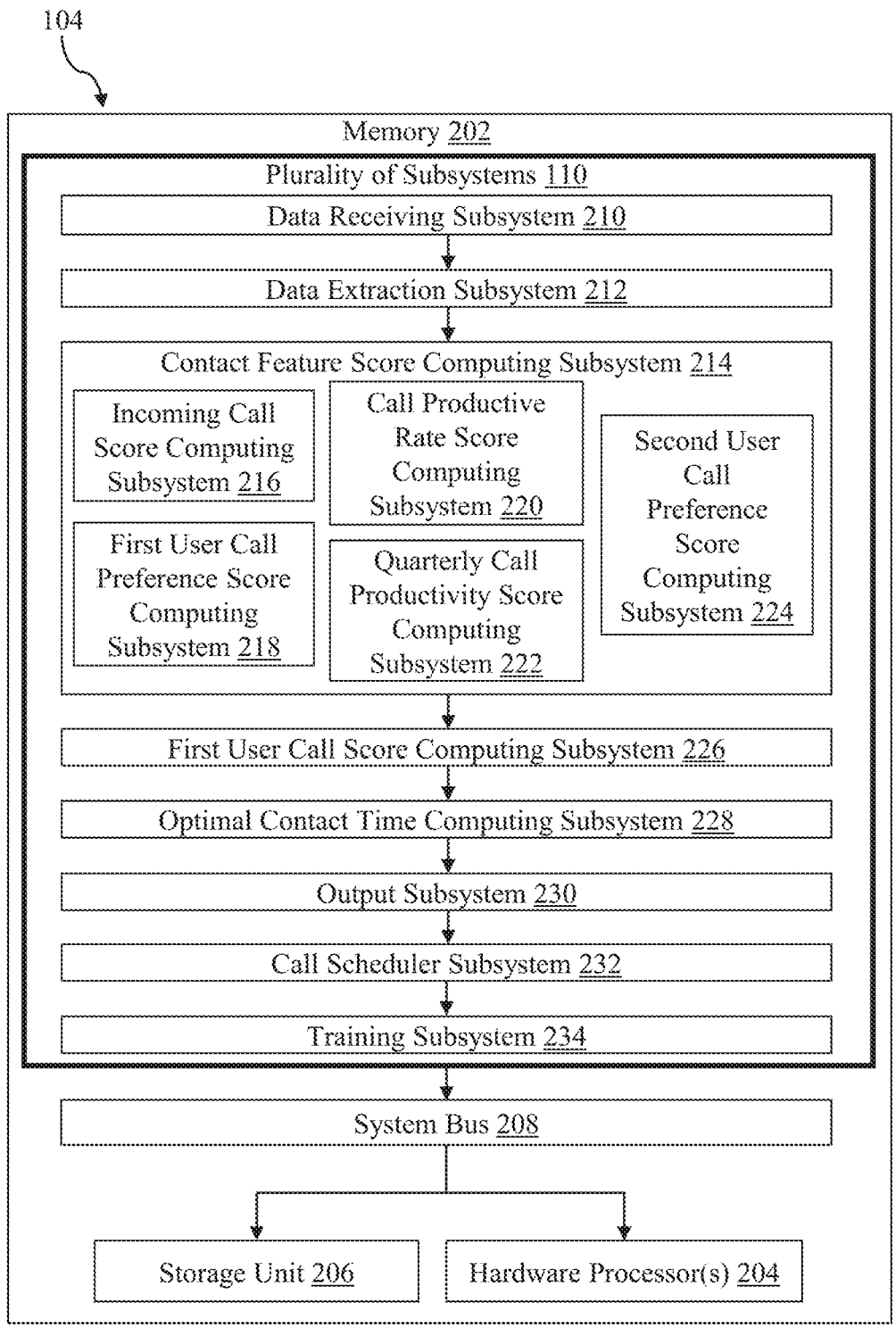
FIG. 2 is a detailed view of the ML-based computing system for computing the one or more optimal contact times to communicate with the first one or more users, in accordance with another embodiment of the present disclosure.

FIG. 2 is a detailed view of the ML-based computing system 104 for computing the one or more optimal contact times to communicate with the first one or more users, in accordance with another embodiment of the present disclosure. The ML-based computing system 104 includes a memory 202, one or more hardware processors 204, and a storage unit 206. The one or more hardware processors 204, the memory 202 and the storage unit 206 are communicatively coupled through a system bus 208 or any similar mechanism. The memory 202 includes the plurality of subsystems 110 in the form of programmable instructions executable by the one or more hardware processors 204.

The plurality of subsystems 110 includes a data receiving subsystem 210, a data extraction subsystem 212, a contact feature score computing subsystem 214, a first user call score computing subsystem 226, an optimal contact time computing subsystem 228, an output subsystem 230, a call scheduler subsystem 232, and a training subsystem 234.

Further, the contact feature score computing subsystem 214 includes an incoming call score computing subsystem 216, a first user call preference score computing subsystem 218, a call productive rate score computing subsystem 220, a quarterly call productivity score computing subsystem 222, and a second user call preference score computing subsystem 224. The brief details of the plurality of subsystems 110 have been elaborated in a below table.

one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable pro-

| Plurality of Subsystems 110 | Functionality |
|---|---|
| Data Receiving Subsystem 210 | The data receiving subsystem 210 is configured to receive the one or more inputs from the second one or more users. |
| Data Extraction Subsystem 212 | The data extraction subsystem 212 is configured to extract the one or more data associated with the first one or more users and the second one or more users from the one or more databases 108, based on the one or more inputs received from the second one or more users. |
| Contact Feature Score Computing Subsystem 214 | The contact feature score computing subsystem 214 is configured to compute one or more contact feature scores based on the extracted one or more data associated with the first one or more users and the second one or more users, for each specified interval of the contact prediction window. The one or more contact feature scores comprises at least one of: incoming call score at each specified interval, first user call preference score, call productive rate, quarterly call productivity score, and second user call preference score. In a non-limiting embodiment, each specified interval includes at least one of: 30 minutes, one-hour, two-hours, and the like. |
| First User Call Score Computing Subsystem 226 | The First User Call Score Computing subsystem 226 is configured to compute one or more first user call scores (i.e., one or more customer call scores) for each specified interval of the contact prediction window based on the one or more contact feature scores for each specified interval of the contact prediction window, using a machine learning model. In a non-limiting embodiment, each specified interval includes at least one of: 30 minutes, one-hour, two-hours, and the like. |
| Optimal Contact Time Computing Subsystem 228 | The optimal contact time computing system 228 is configured to compute at least one of: the one or more optimal contact times and a prioritized list of the one or more optimal contact times by ranking each specified interval of the contact prediction window associated with the one or more first user call scores. |
| Output Subsystem 230 | The output subsystem 230 is configured to provide an output of at least one of: the one or more optimal contact times and the prioritized list of the one or more optimal contact times to the second one or more users on the user interface associated with the one or more electronic devices 102. |
| Call Scheduler Subsystem 232 | The call scheduler subsystem 232 is configured to communicate with the first one or more users by scheduling one or more calls with the first one or more users during the one or more optimal contact times. |
| Training Subsystem 234 | The training subsystem 234 is configured to re-train/update the machine learning model over the plurality of time intervals based on one or more training data. |

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The grammable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the data receiving subsystem 210 that is communicatively connected to the one or more hardware processors 204. The data receiving subsystem 210 is configured to receive the one or more inputs from the one or more users. In an embodiment, the one or more inputs includes the information related to at least one of: the one or more entities associated with the first one or more users, and the contact prediction window associated with a predefined time duration during which the second one or more users requires the optimal instance for a communication with the first one or more users.

For example, if the second one or more users want to compute the one or more optimal contact times (i.e., one or more optimal customer contact times) to contact "ABC Corporation" between August 5 and Aug. 12, 2023, then the second one or more users indicates "ABC Corporation" as the one or more entities and delineates the contact prediction window as August 5 to Aug. 12, 2023. In another example, the second one or more users want to compute the one or more optimal contact times to contact "Mr. XYZ from ABC Corporation", then the second one or more users may indicate "Mr. XYZ" as the one or more entities and delineate the contact prediction window. In certain embodiments, the contact prediction window is predefined or pre-set for the second one or more users. For example, the contact prediction window may be set to the next one month or one year for the second one or more users.

In an embodiment, the first one or more users may include at least one of: the one or more debtors, the one or more customers, the one or more organizations, the individual within the one or more organizations, the one or more parent companies, the one or more subsidiaries, the one or more joint ventures, the one or more partnerships, and the one or more legal entities. In an embodiment, the first one or more users owes at least one of: a financial obligation, liability, and debt. In another embodiment, the one or more legal entities may include at least one of: the one or more corporations, the one or more partnerships, the one or more governmental bodies, the one or more associations, and the like. In an embodiment, the second one or more users may include at least one of: the one or more data analysts, the one or more business analysts, the one or more cash analysts, the one or more financial analysts, the one or more collection analysts, the one or more debt collectors, the one or more professionals associated with the cash and collection management, and the like.

The plurality of subsystems 110 further includes the data extraction subsystem 212 that is communicatively connected to the one or more hardware processors 204. The data extraction subsystem 212 is configured to extract the one or more data associated with the first one or more users and the second one or more users from the one or more databases 108, based on the one or more inputs received from the second one or more users. In an embodiment, the one or more data associated with the first one or more users include at least one of: first one or more identifiers corresponding to the first one or more users, one or more timestamps of one or more incoming calls, one or more timestamps of one or more outgoing calls, one or more time durations of at least one of: the one or more incoming calls and the one or more outgoing calls, one or more notes associated with at least one of: the one or more incoming calls and the one or more outgoing calls, one or more timestamps of one or more interactions with the first one or more users throughout a quarter time period, one or more timestamps of one or more incoming emails, a nature of a day comprising at least one of: a weekend, a working day, and a holiday.

In an embodiment, the one or more data associated with the second one or more users include at least one of: second one or more identifiers corresponding to the second one or more users occupied in call activities with the first one or more users, and one or more timestamps when each second user is occupied in the call activities with the first one or more users. In an embodiment, the one or more data associated with the first one or more users and the second one or more users, are extracted from the one or more databases 108 based on one or more techniques including at least one of: data normalization, data anonymization, data aggregation, data analysis, data storage for future use, and the like. In an embodiment, the one or more databases 108 includes at least one of: one or more relational databases, one or more object-oriented databases, one or more data warehouses, one or more cloud-based databases, and the like.

The plurality of subsystems 110 further includes the contact feature score computing subsystem 214 that is communicatively connected to the one or more hardware processors 204. The contact feature score computing subsystem 214 is configured to compute the one or more contact feature scores based on the extracted one or more data associated with the first one or more users and the second one or more users, for each specified interval of the contact prediction window. In an embodiment, the one or more contact feature scores comprises at least one of the incoming call score at each specified interval, the first user call preference score, the call productive rate score, the quarterly call productivity score, and the second user call preference score.

The contact feature score computing subsystem 214 includes the incoming call score computing subsystem 216 that is communicatively connected to the one or more hardware processors 204. In other words, the incoming call score computing subsystem 216 is a subsystem of the contact feature score computing subsystem 214. The incoming call score computing subsystem 216 is configured to quantify a proportion of incoming calls during specific specified intervals of a day for the first one or more users (i.e., customers or debtors), categorized by the nature of the day as either a weekend, holiday, or working day. The incoming call score computing subsystem 216 is configured to compute the incoming call score at each specified interval by dividing a count of the one or more incoming calls received from the particular first one or more users during a designated specified interval by cumulative one or more incoming calls (i.e., a total number of one or more incoming calls) received from the first one or more users throughout a day. For a given specified interval, the incoming call score is computed as the ratio of the number of the one or more incoming calls received in that specified interval to the total number of the one or more incoming calls across all specified intervals. The incoming call score provides a normalized representation of the temporal distribution of the one or more incoming calls from each user of the first one or more users. In a non-limiting embodiment, each specified interval includes at least one of: 30 minutes, one-hour, two-hours, and the like.

In a non-limiting example, on a particular Saturday, if a business entity (i.e., the second one or more users) received a total of 40 incoming calls from a customer or debtor (i.e., the first one or more users). Out of these, 10 calls occurred during the 11 AM to 11.30 PM time slot. The "incoming call at 11 AM" parameter is calculated by: (number of calls at 11 AM)/(total number of calls for the day). Therefore, incoming call score at 11 AM=10/40=0.25. In another non-limiting example, on a particular Wednesday, if a business entity received a total of 60 incoming calls from a customer or debtor. Out of these, 20 calls occurred during the 3 PM to 4 PM slot. The "incoming call score at 3 PM" parameter is calculated by: (number of calls at 3 PM)/(total number of calls for the day). Therefore, incoming call score at 3 PM=20/60=0.33.

The contact feature score computing subsystem 214 further includes the first user call preference score computing subsystem 218 (i.e., a customer call preference score computing subsystem) that is communicatively connected to the one or more hardware processors 204. In other words, the first user call preference score computing subsystem 218 is a subsystem of the contact feature score computing subsystem 214. The first user call preference score computing subsystem 218 is configured to assess the preference of the first one or more users (i.e., the customers or debtors) for receiving the one or more incoming calls compared to other communication channels including one or more emails. The first user call preference score computing subsystem 218 is configured to compute the first user call preference score by determining a percentage of the one or more incoming calls received from the first one or more users out of a total of the one or more incoming calls and the one or more incoming emails for each specified interval of the first one or more users.

In a non-limiting example, the second one or more users (e.g., collection analyst) has received 10 incoming calls and 20 emails between 2 PM-3 PM. The first user call preference score (i.e., customer call preference score) for 2 PM-3 PM is 10 (incoming calls)/(10+20) (incoming calls+emails), which equals to 0.33. In another non-limiting example, a collection analyst has received 18 incoming calls and 6 emails between 4 PM-5 PM. The first user call preference score for 4 PM-5 PM is 18 (incoming calls)/24 (incoming calls+emails), which equals to 0.75.

The contact feature score computing subsystem 214 further includes the call productive rate score computing subsystem 220 that is communicatively connected to the one or more hardware processors 204. In other words, the call productive rate score computing subsystem 220 is a subsystem of the contact feature score computing subsystem 214. The call productive rate score computing subsystem 220 is configured to assess an efficiency of the one or more outgoing calls within a designated time frame or specified interval, including at least one of: 15 minutes, 30 minutes, an hour, and the like. The call productive rate score computing subsystem 220 is configured to gauge the proportion of one or more productive outgoing calls against a total volume of the one or more outgoing calls during the specified period. The one or more productive outgoing calls is derived by productivity call criteria that is associated with at least one of: a duration of one or more conversation calls between the first one or more users and the second one or more users exceeds at least a predetermined length of time, and the one or more conversation calls is supported by one or more system-recorded notes comprising relevant actions. In certain embodiments, the predetermined length of time includes at least one of: 5 seconds, 10 seconds, and the like.

The call productive rate score computing subsystem 220 is configured to compute the call productive rate by dividing a count of the one or more outgoing calls reaching the productivity call criteria by a total number of the one or more outgoing calls. In a non-limiting example, a team received 80 calls from the first one or more users (i.e., one or more debtors). Among these 80 calls, 50 calls had conversations lasting more than 10 seconds or had associated notes with recorded actions. The call productive rate score is computed as follows: (50/80)=0.625. In another non-limiting example, a team received 120 calls from the first one or more users. Among these 120 calls, 25 calls had conversations lasting more than 10 seconds or had associated notes with recorded actions. The call productive rate score is calculated as follows: (25/120)=0.208.

The contact feature score computing subsystem 214 further includes the quarterly call productivity score computing subsystem 222 that is communicatively connected to the one or more hardware processors 204. In other words, the quarterly call productivity score computing subsystem 222 is a subsystem of the contact feature score computing subsystem 214. The quarterly call productivity score computing subsystem 222 is configured to assess an average efficiency of customer interactions across a three-month period. The quarterly call productivity score computing subsystem 222 is configured to quantify the collective effectiveness of engagements by computing the average productive rate for a particular customer or debtor during each quarter time period. To compute the quarterly call productivity (QCP) score, the one or more individual call productive rate (CPR) scores are derived from productive interactions that occurred throughout the quarter time period, i.e., three-month period, potentially at different times of each day.

The quarterly call productivity score computing subsystem 222 is configured to compute the quarterly call productivity score by (a) computing one or more individual call productive rate scores from one or more productive communications between the first one or more users and the second one or more users, occurred at a plurality of times of each day throughout the quarter time period, (b) aggregating the one or more individual call productive rate scores, and (c) dividing the aggregated one or more individual call productive rate scores by a total count of the one or more individual call productive rate scores to compute the quarterly call productivity score.

In a non-limiting example, the first one or more users (e.g., the one or more customers or debtors) engages with the second one or more users (e.g., company's collection analysts) during various specified intervals in the quarter time period. The recorded call productive rate (CPR) scores for these specified intervals are 0.75, 0.8, 0.70, and 0.85. Aggregating/Summing the one or more individual call productive rate (CPR) scores gives a total of 3.10, and since there were four interactions (n=4), the quarterly call productivity (QCP) score for the first one or more users (i.e., the one or more customers or debtors) during the first quarter time period is 3.10/4=0.775.

In another non-limiting example, the first one or more users (i.e., the one or more customers or debtors) engages with the second one or more users (e.g., company's collection analysts) during various specified intervals in the quarter time period. The recorded call productive rate (CPR) scores for these specified intervals are 0.6, 0.7, 0.65, and 0.75. Aggregating/Summing the one or more individual call productive rate (CPR) scores gives a total of 2.7, and since there were four interactions (n=4), the quarterly call productivity (QCP) score for the first one or more users (e.g., the one or more customers or debtors) during the first quarter time period is 2.7/4=0.675.

The contact feature score computing subsystem 214 further includes the second user call preference score computing subsystem 224 (e.g., a collector's call preference (CoCP) score computing subsystem) that is communicatively connected to the one or more hardware processors 204. In other words, the second user call preference score computing subsystem 224 is a subsystem of the contact feature score computing subsystem 214. The second user call preference score computing subsystem 224 is configured to aggregate second one or more individual call productive rate scores associated with each user of the second one or more users occupied in the call activities with the first one or more users within a specified interval. The second user call preference score computing subsystem 224 is further configured to divide the aggregated second one or more individual call productive rate scores by a total count of the second one or more users occupied in the call activities with the first one or more users during the specified interval, to compute the second user call preference score (i.e., collector's call preference (CoCP) score).

In a non-limiting example, there are four collectors (e.g., WWW, XXX, YYY, and ZZZ, each with corresponding call productive rate (CPR) scores of 0.75, 0.80, 0.65, and 0.70, respectively. The second user call preference score for this specified interval is computed by summing these CPR scores (0.75+0.80+0.65+0.70=2.90) and then dividing by the total count of collectors (i.e., four), which results in the second user call preference score of 0.725.

In a non-limiting example, there are four collectors (e.g., AAA, BBB, CCC, DDD, EEE, and FFF, each with corresponding call productive rate (CPR) scores of 0.85, 0.70, 0.75, 0.80, 0.90, and 0.78, respectively. The second user call preference score for this specified interval is computed by summing these CPR scores (0.85+0.70+0.75+0.80+0.90+0.78=4.78) and then dividing by the total count of collectors (i.e., six), which results in the second user call preference score of 0.7967.

The plurality of subsystems 110 includes the first user call score computing subsystem 226 (i.e., a customer call score generation subsystem) that is communicatively connected to the one or more hardware processors 204. The first user call score computing subsystem 226 is configured to compute one or more first user call scores (e.g., one or more customer call scores) for each specified interval of the contact prediction window based on the one or more contact feature scores for each specified interval of the contact prediction window, using a machine learning model.

For computing the one or more first user call scores for each specified interval of the contact prediction window, the first user call score computing subsystem 226 is initially configured to determine one or more weightages for each contact feature score of the one or more contact feature scores using the machine learning model. In an embodiment, the machine learning model may be a gradient descent based machine learning model. The first user call score computing subsystem 226 is further configured to assign the determined one or more weightages to the one or more contact feature scores. The first user call score computing subsystem 226 is further configured to aggregate the assigned one or more weightages to the one or more contact feature scores to compute the one or more first user call scores for each specified interval of the contact prediction window.

In an embodiment, the computation of the one or more first user call scores (i.e., the one or more customer call scores) for each specified interval of the contact prediction window and computation of the one or more optimal contact times to communicate with the first one or more users, are not static activities. Specifically, the computer-implemented system 104 and applications are configured to monitor the one or more customer data from the one or more databases 108 or one or more information sources to determine a status of the first one or more users as the computer-implemented system 104 evolves through a plurality of time intervals.

The plurality of subsystems 110 includes the training subsystem 234 that is communicatively connected to the one or more hardware processors 204. The training subsystem 234 is configured to train the machine learning model for computing the one or more first user call scores (i.e., the one or more customer call scores) for each specified interval of the contact prediction window.

The machine learning model is initially configured to receive one or more training datasets associated with the one or more contact feature scores, from the contact feature score computing subsystem 214. For training the machine learning model, one or more initial weightages are assigned as given in a below table.

| Inputs to first user call score computing subsystem 226 | Initial weight |
|---|---|
| Incoming call score computing subsystem 216 | 1 |
| First user call preference score computing subsystem 218 | 0.8 |
| Call productive rate score computing subsystem 220 | 0.6 |
| Quarterly call productivity score computing subsystem 222 | 0.4 |
| Second user call preference score computing subsystem 224 | 0.2 |

In an embodiment, the prepared one or more training datasets includes multiple input-output pairs. The one or more training datasets includes one or more input features, including, but not limited to the incoming call (IC) scores at each specified interval, the first user call preference (CP) scores, the call productive rates (CPR) scores, the quarterly call productivity (QCP) scores, and the second user call preference (CoCP) scores. The input features are appropriately mapped to the output of the one or more first user call scores (i.e., the customer call scores). The one or more training datasets are shuffled and divided into training and validation datasets for training the machine learning model.

In another embodiment, the one or more input features are scaled or normalized to ensure stable training. In yet another embodiment, anomalies are removed. In yet another embodiment, outliers, errors, or mislabelled data are removed or corrected to ensure that the one or more training datasets are robust for training.

The machine learning model is configured to perform forward passes with the one or more initial weightages by processing the one or more training datasets associated with the one or more contact feature scores, through the machine learning model to compute the one or more first user call scores for each specified interval of the contact prediction window. The machine learning model is further configured to execute one or more loss functions including at least one of: mean squared error (MSE) and mean absolute error (MAE) to determine a difference between the computed one or more first user call scores and actual one or more first user call scores.

The machine learning model is further configured to compute gradients of one or more losses for the one or more initial weightages of each contact feature score of the one or more contact feature scores. The machine learning model is further configured to update the one or more initial weightages of each contact feature score of the one or more contact feature scores based on the gradient of one or more losses and a learning rate. In an embodiment, the learning rate is determined at a time of training the machine learning model. In another embodiment, the learning rate is a hyperparameter in a context of one or more gradient descent rules for training the machine learning model. In yet another embodiment, the learning rate is configured to determine a step size at which the one or more gradient descent rules updates one or more parameters of the machine learning model in a direction that reduces the one or more loss functions.

The machine learning model is further configured to repeat a process of at least of: performance of the forward passes, the computation of the gradient of one or more losses, updating of the one or more initial weightages, until convergence is achieved. The convergence is achieved when the one or more losses is reduced significantly. The machine learning model is further configured to determine the one or more weightages of each contact feature score of the one or more contact feature scores for the one or more parameters of the machine learning model. After completing the specified number of iterations or achieving convergence, the one or more weightages for one or more parameters, selected from the incoming call at each specified interval (IC) scores, the first user call preference (CP) scores, the call productive rate (CPR) scores, the quarterly call productivity (QCP) scores, and the second user call preference (CoCP) scores that best approximate the machine learning model are achieved.

The training subsystem 234 is further configured to validate the machine learning model based on one or more validation datasets. In an embodiment, the machine learning model is validated by the training system 230 by determining whether the machine learning model is trained until the one or more losses reaches a stable state indicating the achieved convergence. In other words, the validation of the machine learning model is executed using the one or more validation datasets, and training the machine learning model continues until the validation loss reaches a plateau, indicating satisfactory convergence. In an embodiment, adjustments to the learning rate during training are feasible to enhance convergence efficiency. Upon achieving a plateaued validation loss, the machine learning model is deemed trained. To assess the machine learning model's generalization capability, the machine learning model is subsequently evaluated on an independent test set, demonstrating performance of the machine learning model on previously unseen data.

The plurality of subsystems 110 includes the optimal contact time computing system 228 that is communicatively connected to the one or more hardware processors 204. The optimal contact time computing system 228 is configured to compute at least one of: the one or more optimal contact times and a prioritized list of the one or more optimal contact times by ranking each specified interval of the contact prediction window associated with the one or more first user call scores. In an embodiment, each specified interval of the contact prediction window associated with the one or more first user call scores, is ranked in a descending order according to the one or more first user call scores for each specified interval of the contact prediction window. In an embodiment, the second one or more users may have an option to select an appropriate optimal contact time from the prioritized list of the one or more optimal contact times computed/generated by the optimal contact time computing system 228.

In a non-limiting example, if one or more first user call scores for: (a) 11 AM to 12 PM time slot on $5^{th}$ August is 4, (b) 12 PM to 1 PM time slot on $5^{th}$ August is 2.5, and (c) 1 PM to 2 PM time slot on $5^{th}$ August is 5.5, then 1 PM to 2 PM time slot on $5^{th}$ August is the optimal contact time to communicate with the first one or more users.

The plurality of subsystems 110 includes the output subsystem 230 that is communicatively connected to the one or more hardware processors 204. The output subsystem 230 is configured to provide an output of at least one of: the one or more optimal contact times and the prioritized list of the one or more optimal contact times to the second one or more users on the user interface associated with the one or more electronic devices 102.

The plurality of subsystems 110 includes the call scheduler subsystem 232 that is communicatively connected to the one or more hardware processors 204. The call scheduler subsystem 232 is configured to communicate with the first one or more users by scheduling one or more calls with the first one or more users during the one or more optimal contact times. When provided with the one or more optimal contact times, the call scheduler subsystem 232 is configured to assess the availability of the first one or more users (i.e., customer's or debtor's availability) within the contact prediction window. The call scheduler subsystem 232 is further configured to determine the schedule and commitments of the first one or more users to ascertain mutual availability, preventing scheduling conflicts, which guarantees an efficient connection point.

In an embodiment, the call scheduler subsystem 232 is further configured to accommodate at least one of: the one or more optimal contact times and the prioritized list of the one or more optimal contact times, to analyze each slot's suitability and also to cross-reference with the schedule of the first one or more users. The above said processes enable a selection of an available and optimal contact time slot that aligns with the schedules of both first one or more users and the second one or more users. Further, the call scheduler subsystem 232 is configured to adapt to preferences of the first one or more users, offering flexibility in one or more communication modes. Further, the call scheduler subsystem 232 is configured to arrange the scheduled interaction with the first one or more users by determining whether the first one or more users prefers at least one of audio calls, and video calls.

The training subsystem 234 is configured to re-train/update the machine learning model over the plurality of time intervals based on one or more training data. For re-training/updating the machine learning model over the plurality of time intervals, the training subsystem 234 is configured to receive the one or more training data associated with at least one of: the one or more optimal contact times and the prioritized list of the one or more optimal contact times, from the output subsystem 230. The training subsystem 234 is further configured to add the one or more training data with the one or more training datasets to generate one or more updated training datasets including at least one of: first one or more data points and second one or more data points.

The training subsystem 234 is further configured to re-train/update the machine learning model to update the one or more weightages by performing the process of at least one of: the performance of the forward passes, the computation of the gradient of one or more losses, updating of the one or more initial weightages, until convergence is achieved. The training subsystem 234 is further configured to execute the re-trained/updated machine learning model in the first user call score computing subsystem 226 to compute the one or more first user call scores for each specified interval of the contact prediction window over the plurality of time intervals.

Figure 3:
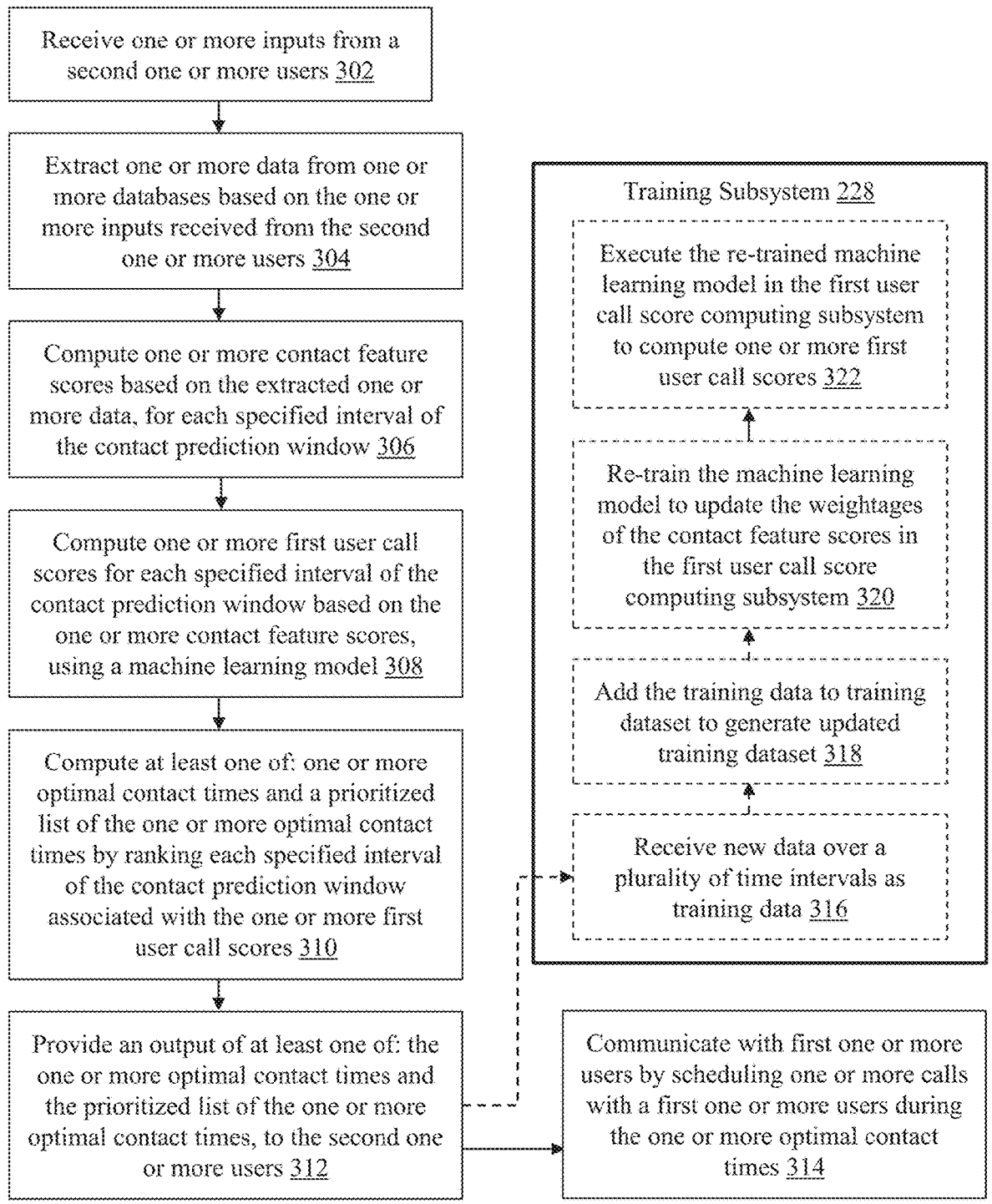
FIG. 3 is an overall process flow of computing the one or more optimal contact times to communicate with the first one or more users, in accordance with another embodiment of the present disclosure.

FIG. 3 is an overall process flow 300 of computing the one or more optimal contact times to communicate with the first one or more users, in accordance with another embodiment of the present disclosure. At step 302, the one or more inputs is received from the second one or more users. In an embodiment, the one or more inputs includes the information related to at least one of: the one or more entities associated with the first one or more users and the contact prediction window. The contact prediction window (i.e., the prediction window) represents the predefined time duration during which the second one or more users require the optimal instance for the communication with the first one or more users.

At step 304, the one or more data associated with the first one or more users and the second one or more users from the one or more databases 108, based on the one or more inputs received from the second one or more users.

At step 306, the one or more contact feature scores is computed based on the extracted one or more data associated with the first one or more users and the second one or more users, for each specified interval of the contact prediction window. In an embodiment, the one or more contact feature scores includes at least one of: the incoming call (IC) score at each specified interval, the first user call preference (CP) score (i.e., customer call preference (CP) score), the call productive rate (CPR) score, the quarterly call productivity (QCP) score, and the second user call preference score (i.e., collector's call preference (CoCP) score).

At step 308, the one or more first user call scores (i.e., the one or more customer call scores) is computed for each specified interval of the contact prediction window based on the one or more contact feature scores for each specified interval of the contact prediction window, using the machine learning model. At step 310, at least one of the one or more optimal contact times and the prioritized list of the one or more optimal contact times, is computed by ranking each specified interval of the contact prediction window associated with the one or more first user call scores.

At step 312, the output of at least one of: the one or more optimal contact times and the prioritized list of the one or more optimal contact times to the second one or more users on the user interface associated with the one or more electronic devices 102. At step 314, the one or more calls are scheduled to communicate with the first one or more users during the one or more optimal contact times.

Figure 4:
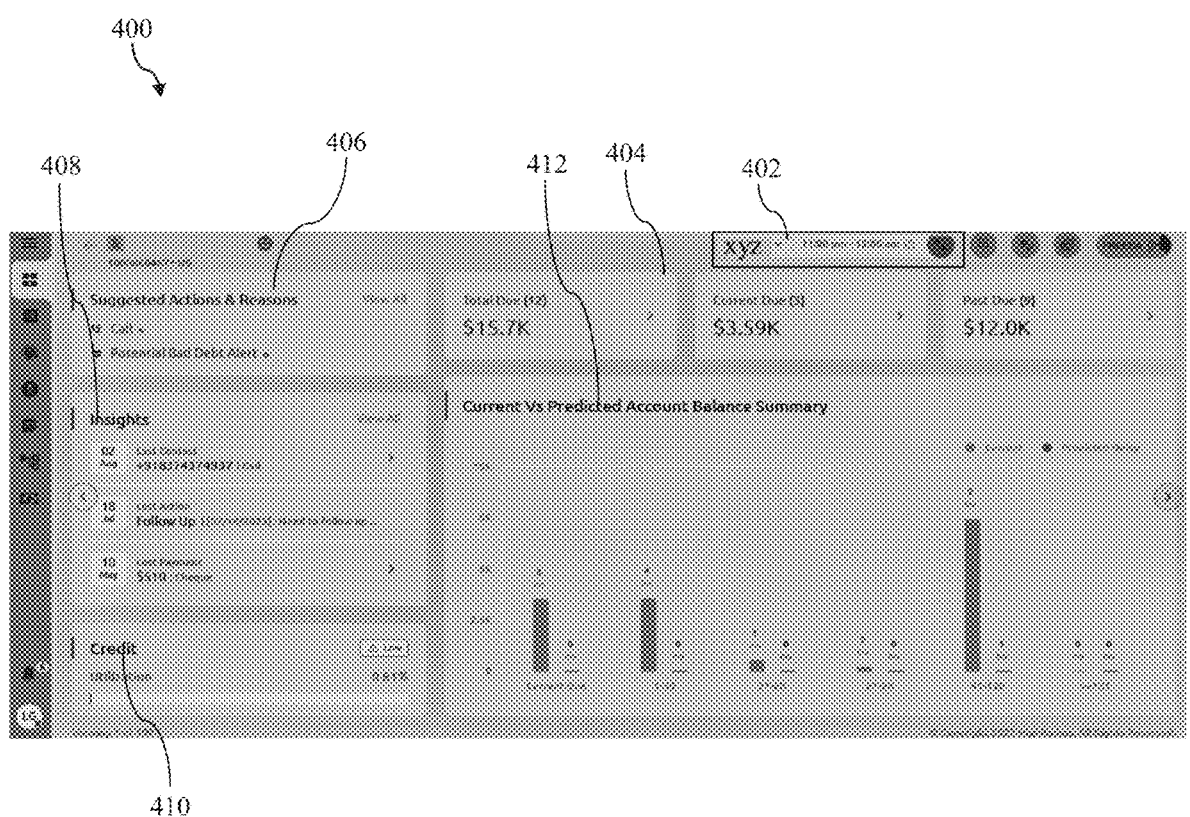
FIG. 4 is an exemplary graphical representation of an output of at least one of: the one or more optimal contact times and the prioritized list of the one or more optimal contact times to a second one or more users on an user interface, in accordance with an embodiment of the present disclosure.

At step 316, the one or more training data associated with at least one of the one or more optimal contact times and the prioritized list of the one or more optimal contact times, are received from one or more second users. At step 318, the one or more training data are added with the one or more training datasets to generate one or more updated training datasets. At step 320, the machine learning model is re-trained to update the one or more weightages by performing the process of at least one of: the performance of the forward passes, the computation of the gradient of one or more losses, updating of the one or more initial weightages, until convergence is achieved. At step 322, the re-trained/updated machine learning model is executed in the first user call score computing subsystem 226 to compute the one or more first user call scores for each specified interval of the contact prediction window over the plurality of time intervals, FIG. 4 is an exemplary graphical representation 400 of an output of at least one of: the one or more optimal contact times and the prioritized list of the one or more optimal contact times to the second one or more users on the user interface, in accordance with an embodiment of the present disclosure. The graphical representation 400 shows the optimal contact time 402 to communicate with the customer or debtor (e.g., XYZ). The graphical representation 400 further shows one or more details associated with at least one of: total, current, and past due amount 404, a suggested actions and reasons tab 406, an insights tab 408, a credit tab 410, and a current versus predicted account balance summary tab 412.

Figure 5:
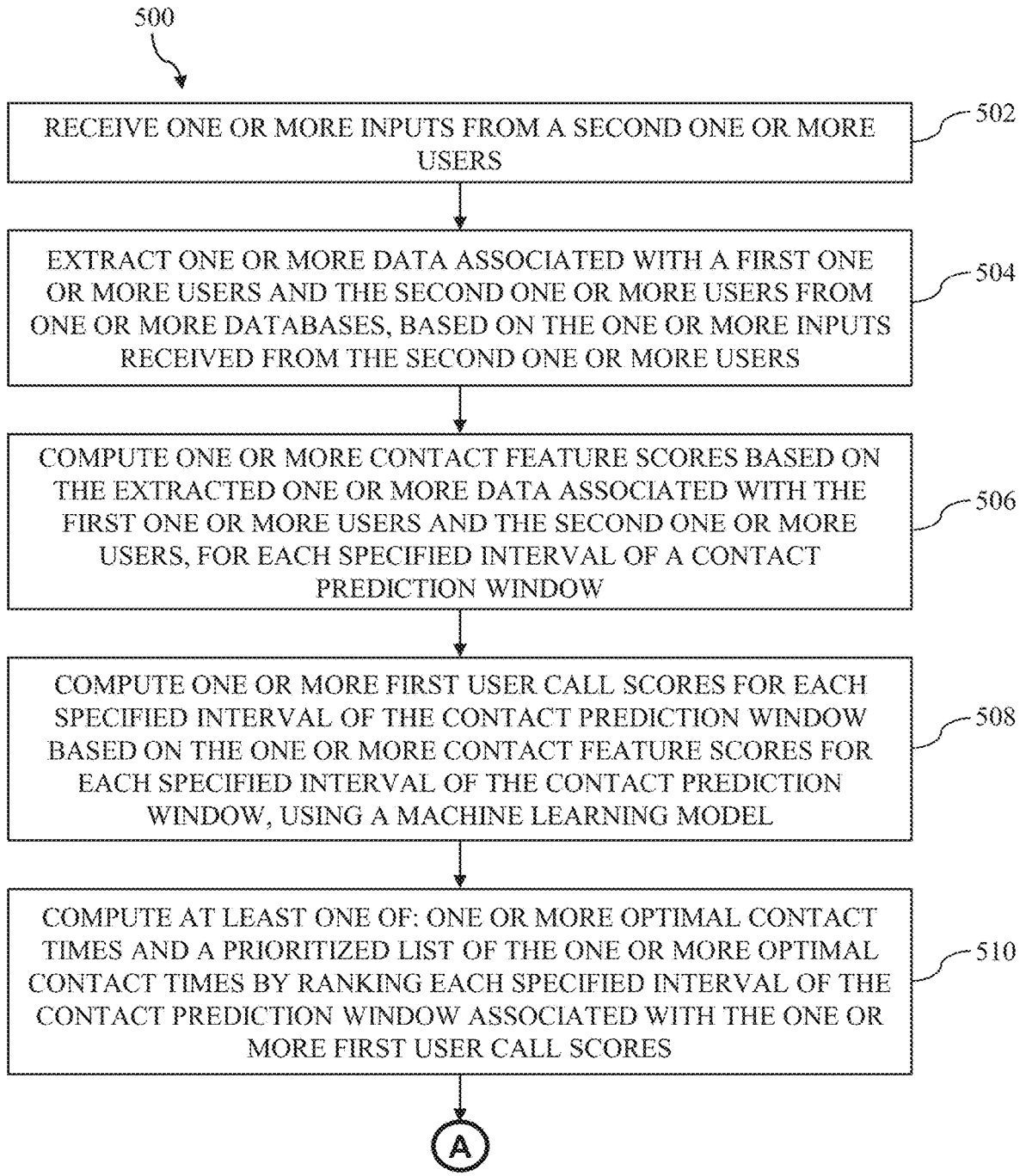
FIG. 5 is a flow chart illustrating a machine-learning based (ML-based) computing method for computing the one or more optimal contact times to communicate with the first one or more users, in accordance with an embodiment of the present disclosure.
Figure 5:
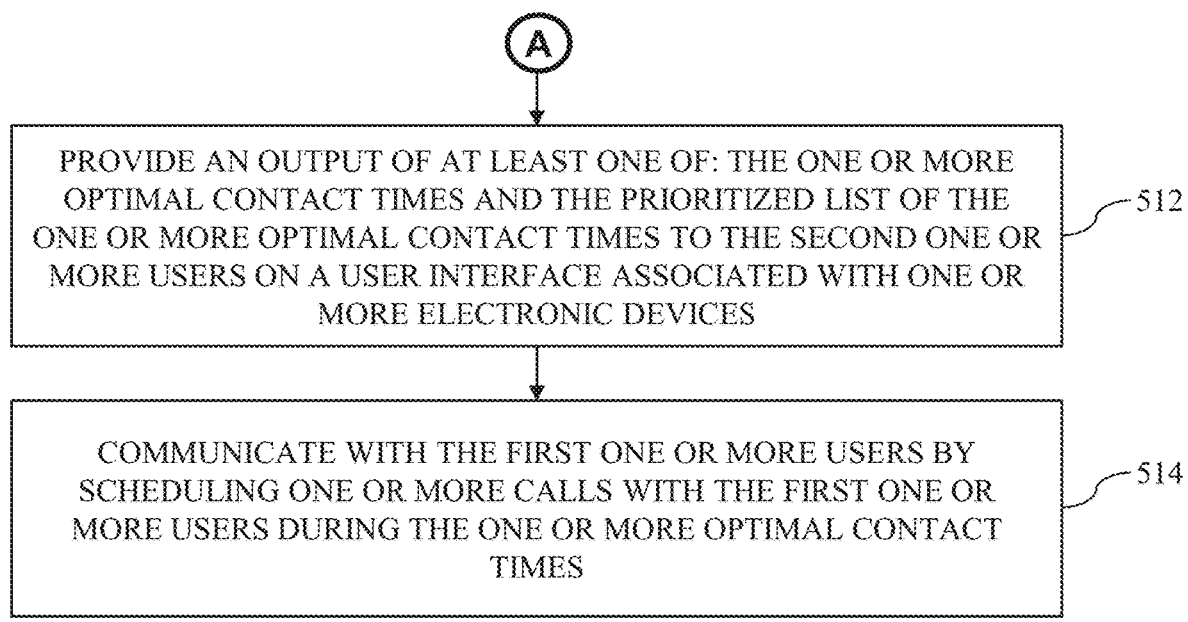

FIG. 5 is a flow chart illustrating a machine-learning based (ML-based) computing method 500 for computing the one or more optimal contact times to communicate with the first one or more users, in accordance with an embodiment of the present disclosure.

At step 502, the one or more inputs is received from the second one or more users. In an embodiment, the one or more inputs includes the information related to at least one of: the one or more entities associated with the first one or more users and the contact prediction window. The contact prediction window (i.e., the prediction window) represents the predefined time duration during which the second one or more users require the optimal instance for the communication with the first one or more users.

At step 504, the one or more data associated with the first one or more users and the second one or more users from the one or more databases 108, based on the one or more inputs received from the second one or more users.

At step 506, the one or more contact feature scores are computed based on the extracted one or more data associated with the first one or more users and the second one or more users, for each specified interval of the contact prediction window. In an embodiment, the one or more contact feature scores includes at least one of: the incoming call (IC) score at each specified interval, the first user call preference (CP) score (i.e., customer call preference (CP) score), the call productive rate (CPR) score, the quarterly call productivity (QCP) score, and the second user call preference score (i.e., collector's call preference (CoCP) score).

At step 508, the one or more first user call scores (i.e., the one or more customer call scores) are computed for each specified interval of the contact prediction window based on the one or more contact feature scores for each specified interval of the contact prediction window, using the machine learning model. At step 510, at least one of the one or more optimal contact times and the prioritized list of the one or more optimal contact times, are computed by ranking each specified interval of the contact prediction window associated with the one or more first user call scores. In an embodiment, each specified interval comprises at least one of: 30 minutes, one-hour, two-hours, and the like.

At step 512, the output of at least one of: the one or more optimal contact times and the prioritized list of the one or more optimal contact times to the second one or more users on the user interface associated with the one or more electronic devices 102. At step 514, the one or more calls are scheduled to communicate with the first one or more users during the one or more optimal contact times. In FIG. 5, the circular symbol with "A" written inside is being used as an off-page connector. This is used for indicating that FIG. 5 continues in the next page.

The present invention has the following advantages. The present invention with the ML-based computing system 104 is configured to recommend the one or more optimal contact time to the second one or more users to communicate with the first one or more users. The ML-based computing system 104 and the ML-based computing method 500 aim at maximizing the chances of successfully collecting outstanding debts while maintaining a positive customer or debtor experience.

Further, the present invention is used to assess the availability of the first one or more users (i.e., customer's or debtor's availability) within the contact prediction window, based on the one or more optimal contact times. The present invention is used to determine the schedule and commitments of the first one or more users to ascertain the mutual availability, preventing scheduling conflicts, which guarantees the efficient connection point.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O)) devices (including but not limited to keyboards, displays, pointing devices, etc.) can be coupled to the ML-based computing system 104 either directly or through intervening I/O controllers. Network adapters may also be coupled to the ML-based computing system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/ML-based computing system 104 in accordance with the embodiments herein. The ML-based computing system 104 herein comprises at least one processor or central processing unit (CPU). The CPUs are interconnected via system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the ML-based computing system 104. The ML-based computing system 104 can read the inventive instructions on the program storage devices and follow these instructions to execute the methodology of the embodiments herein.

The ML-based computing system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine-learning based (ML-based) computing method for computing one or more optimal contact times to communicate with a first one or more users, the ML-based computing method comprising:

receiving, by one or more hardware processors, one or more inputs from a second one or more users, wherein the one or more inputs comprises information related to at least one of: one or more entities associated with the first one or more users, and a contact prediction window associated with a predefined time duration during which the second one or more users requires an optimal instance for a communication with the first one or more users;

extracting, by the one or more hardware processors, one or more data associated with the first one or more users and the second one or more users from one or more databases, based on the one or more inputs received from the second one or more users;

computing, by the one or more hardware processors, one or more contact feature scores based on the extracted one or more data associated with the first one or more users and the second one or more users, for each specified interval of the contact prediction window, wherein the one or more contact feature scores comprises at least one of: incoming call score at each specified interval, first user call preference score, call productive rate score, quarterly call productivity score, and second user call preference score;

training and executing, by the one or more hardware processors, a machine learning model to determine one or more weightages of each contact feature score of the one or more contact feature scores for one or more parameters of the machine learning model, wherein the machine learning model comprises a gradient descent based machine learning model trained by:

receiving, by the one or more hardware processors, one or more training datasets associated with the one or more contact feature scores, from a contact feature score computing subsystem;

performing, by the one or more hardware processors, forward passes with one or more initial weightages by processing one or more training datasets associated with the one or more contact feature scores, through the machine learning model to compute the one or more first user call scores for each specified interval of the contact prediction window;

executing, by the one or more hardware processors, one or more loss functions to determine a difference between the computed one or more first user call scores and actual one or more first user call scores;

computing, by the one or more hardware processors, gradient of one or more losses for the one or more initial weightages of each contact feature score of the one or more contact feature scores;

updating, by the one or more hardware processors, the one or more initial weightages of each contact feature score of the one or more contact feature scores based on the gradient of one or more losses and a learning rate; and repeating, by the one or more hardware processors, a process of at least of: performance of the forward passes, the computation of the gradient of one or more losses, updating of the one or more initial weightages, until convergence is achieved, wherein the convergence is achieved when the one or more losses is reduced;

computing, by the one or more hardware processors, one or more first user call scores for each specified interval of the contact prediction window based on the one or more contact feature scores for each specified interval of the contact prediction window, using the one or more weightages of each contact feature score determined by the machine learning model;

computing, by the one or more hardware processors, at least one of: the one or more optimal contact times and a prioritized list of the one or more optimal contact times by ranking each specified interval of the contact prediction window associated with the one or more first user call scores, wherein each specified interval comprises at least one of: 30 minutes, one-hour, and two-hours;

providing, by the one or more hardware processors, an output of at least one of: the one or more optimal contact times and the prioritized list of the one or more optimal contact times to the second one or more users on an user interface associated with one or more electronic devices; and communicating, by the one or more hardware processors, with the first one or more users by scheduling one or more calls with the first one or more users during the one or more optimal contact times.

2. The machine-learning based (ML-based) computing method of claim 1, wherein:

The first one or more users comprises at least one of: one or more debtors, one or more customers, one or more organizations, an individual within the one or more organizations, one or more parent companies, one or more subsidiaries, one or more joint ventures, one or more partnerships, and one or more legal entities, wherein the first one or more users owes at least one of: a financial obligation, liability, and debt; and the second one or more users comprises at least one of: one or more data analysts, one or more business analysts, one or more cash analysts, one or more financial analysts, one or more collection analysts, one or more debt collectors, and one or more professionals associated with cash and collection management.

3. The machine-learning based (ML-based) computing method of claim 1, wherein:

the one or more data associated with the first one or more users comprise at least one of:

first one or more identifiers corresponding to the first one or more users, one or more timestamps of one or more incoming calls, one or more timestamps of one or more outgoing calls, one or more time durations of at least one of: the one or more incoming calls and the one or more outgoing calls, one or more notes associated with at least one of: the one or more incoming calls and the one or more outgoing calls, one or more timestamps of one or more interactions with the first one or more users throughout a quarter time period, one or more timestamps of one or more incoming emails, a nature of a day comprising at least one of: a weekend, a working day, and a holiday; and the one or more data associated with the second one or more users comprise at least one of: second one or more identifiers corresponding to the second one or more users occupied in call activities with the first one or more users, and one or more timestamps when each second user is occupied in the call activities with the first one or more users.

4. The machine-learning based (ML-based) computing method of claim 1, wherein computing the one or more contact feature scores for each specified interval of the contact prediction window, comprises:

computing, by the one or more hardware processors, the incoming call score at each specified interval by dividing a count of the one or more incoming calls received from the first one or more users during a specified interval cumulative one or more incoming calls received from the first one or more users throughout a day;

computing, by the one or more hardware processors, the first user call preference score by determining a percentage of the one or more incoming calls received from the first one or more users out of a total of the one or more incoming calls and the one or more incoming emails for each specified interval of the first one or more users;

computing, by the one or more hardware processors, the call productive rate score by dividing a count of the one or more outgoing calls reaching productivity call criteria by a total number of the one or more outgoing calls, wherein the productivity call criteria is associated with at least one of: a duration of one or more conversation calls between the first one or more users and the second one or more users exceeds at least a predetermined length of time and the one or more conversation calls is supported by one or more system-recorded notes comprising relevant actions, wherein the predetermined length of time comprises at least one of: 5 seconds and 10 seconds;

computing, by the one or more hardware processors, the quarterly call productivity score by:
- computing, by the one or more hardware processors, one or more individual call productive rate scores from one or more productive communications between the first one or more users and the second one or more users, occurred at a plurality of times of each day throughout the quarter time period;
- aggregating, by the one or more hardware processors, the one or more individual call productive rate scores; and
- dividing, by the one or more hardware processors, the aggregated one or more individual call productive rate scores by a total count of the one or more individual call productive rate scores to compute the quarterly call productivity score; and computing, by the one or more hardware processors, the second user call preference score by:
- aggregating, by the one or more hardware processors, second one or more individual call productive rate scores associated with each user of the second one or more users occupied in the call activities with the first one or more users within a specified interval; and
- dividing, by the one or more hardware processors, the aggregated second one or more individual call productive rate scores by a total count of the second one or more users occupied in the call activities with the first one or more users during the specified interval, to compute the second user call preference score.

5. The machine-learning based (ML-based) computing method of claim 1, wherein computing the one or more first user call scores for each specified interval of the contact prediction window based on the one or more contact feature scores, comprises:
- assigning, by the one or more hardware processors, the determined one or more weightages to the one or more contact feature scores; and
- aggregating, by the one or more hardware processors, the assigned one or more weightages to the one or more contact feature scores to compute the one or more first user call scores for each specified interval of the contact prediction window.

6. The machine-learning based (ML-based) computing method of claim 1, wherein the one or more loss functions comprising at least one of: mean squared error and mean absolute error, wherein the learning rate is determined at a time of training the machine learning model, and wherein the learning rate is a hyperparameter in a context of one or more gradient descent rules for training the machine learning model.

7. The machine-learning based (ML-based) computing method of claim 6, further comprising validating, by the one or more hardware processors, the machine learning model based on one or more validation datasets,
wherein validating the machine learning model comprises determining, by the one or more hardware processors, whether the machine learning model is trained until the one or more losses reaches a stable state indicating the achieved convergence.

8. The machine-learning based (ML-based) computing method of claim 1, further comprising re-training, by the one or more hardware processors, the machine learning model over a plurality of time intervals based on one or more training data, wherein re-training the machine learning model over the plurality of time intervals comprises:
- receiving, by the one or more hardware processors, the one or more training data associated with at least one of: the one or more optimal contact times and the prioritized list of the one or more optimal contact times, from an output subsystem;
- adding, by the one or more hardware processors, the one or more training data with the one or more training datasets to generate one or more updated training datasets comprising at least one of: first one or more data points and second one or more data points;
- re-training, by the one or more hardware processors, the machine learning model to update the one or more weightages by performing the process of at least one of: the performance of the forward passes, the computation of the gradient of one or more losses, updating of the one or more initial weightages, until convergence is achieved; and
- executing, by the one or more hardware processors, the re-trained machine learning model in a first user call score computing subsystem to compute the one or more first user call scores for each specified interval of the contact prediction window over the plurality of time intervals.

9. The machine-learning based (ML-based) computing method of claim 1, wherein the one or more data associated with the first one or more users and the second one or more users, are extracted from the one or more databases based on one or more techniques comprising at least one of: data normalization, data anonymization, data aggregation, data analysis, and data storage; and
wherein the one or more databases comprises at least one of: one or more relational databases, one or more object-oriented databases, one or more data warehouses, and one or more cloud-based databases.

10. A machine learning based (ML-based) computing system for computing one or more optimal contact times to communicate with a first one or more users, the ML-based computing system comprising:
- one or more hardware processors;
- a memory coupled to the one or more hardware processors, wherein the memory comprises a plurality of subsystems in form of programmable instructions executable by the one or more hardware processors, and wherein the plurality of subsystems comprises:
  - a data receiving subsystem configured to receive one or more inputs from a second one or more users, wherein the one or more inputs comprises information related to at least one of: one or more entities associated with the first one or more users and a contact prediction window is associated with a predefined time duration during which the second one or more users requires an optimal instance for a communication with the first one or more users;

a data extraction subsystem configured to extract one or more data associated with the first one or more users and the second one or more users from one or more databases, based on the one or more inputs received from the second one or more users;

a contact feature score computing subsystem configured to compute one or more contact feature scores based on the extracted one or more data associated with the first one or more users and the second one or more users, for each specified interval of the contact prediction window, wherein the one or more contact feature scores comprises at least one of: incoming call score at each specified interval, first user call preference score, call productive rate score, quarterly call productivity score, and second user call preference score;

a training subsystem configured to train and execute a machine learning model to determine one or more weightages of each contact feature score of the one or more contact feature scores for one or more parameters of the machine learning model, wherein the machine learning model comprises a gradient descent based machine learning model trained by:

receiving one or more training datasets associated with the one or more contact feature scores, from the contact feature score computing subsystem;

performing forward passes with one or more initial weightages by processing one or more training datasets associated with the one or more contact feature scores, through the machine learning model to compute the one or more first user call scores for each specified interval of the contact prediction window;

executing one or more loss functions to determine a difference between the computed one or more first user call scores and actual one or more first user call scores;

computing gradient of one or more losses for the one or more initial weightages of each contact feature score of the one or more contact feature scores;

updating the one or more initial weightages of each contact feature score of the one or more contact feature scores based on the gradient of one or more losses and a learning rate; and repeating a process of at least of: performance of the forward passes, the computation of the gradient of one or more losses, updating of the one or more initial weightages, until convergence is achieved, wherein the convergence is achieved when the one or more losses is reduced;

a first user call score computing subsystem configured to compute one or more first user call scores for each specified interval of the contact prediction window based on the one or more contact feature scores for each specified interval of the contact prediction window, using the one or more weightages of each contact feature score determined by the machine learning model;

an optimal contact time computing subsystem configured to compute at least one of: the one or more optimal contact times and a prioritized list of the one or more optimal contact times by ranking each specified interval of the contact prediction window associated with the one or more first user call scores, wherein each specified interval comprises at least one of: 30 minutes, one-hour, and two-hours;

an output subsystem configured to provide an output of at least one of: the one or more optimal contact times and the prioritized list of the one or more optimal contact times to the second one or more users on an user interface associated with one or more electronic devices; and a call scheduler subsystem configured to communicate with the first one or more users by scheduling one or more calls with the first one or more users during the one or more optimal contact times.

11. The machine-learning based (ML-based) computing system of claim 10, wherein:

the first one or more users comprises at least one of: one or more debtors, one or more customers, one or more organizations, an individual within the one or more organizations, one or more parent companies, one or more subsidiaries, one or more joint ventures, one or more partnerships, and one or more legal entities, wherein the first one or more users owes at least one of: a financial obligation, liability, and debt; and the second one or more users comprises at least one of: one or more data analysts, one or more business analysts, one or more cash analysts, one or more financial analysts, one or more collection analysts, one or more debt collectors, and one or more professionals associated with cash and collection management.

12. The machine-learning based (ML-based) computing system of claim 10, wherein:

the one or more data associated with the first one or more users comprise at least one of: first one or more identifiers corresponding to the first one or more users, one or more timestamps of one or more incoming calls, one or more timestamps of one or more outgoing calls, one or more time durations of at least one of: the one or more incoming calls and the one or more outgoing calls, one or more notes associated with at least one of: the one or more incoming calls and the one or more outgoing calls, one or more timestamps of one or more interactions with the first one or more users throughout a quarter time period, one or more timestamps of one or more incoming emails, a nature of a day comprising at least one of: a weekend, a working day, and a holiday; and the one or more data associated with the second one or more users comprise at least one of: second one or more identifiers corresponding to the second one or more users occupied in call activities with the first one or more users, and one or more timestamps when each second user is occupied in the call activities with the first one or more users.

13. The machine-learning based (ML-based) computing system of claim 10, wherein in computing the one or more contact feature scores for each specified interval of the contact prediction window, the contact feature score computing subsystem is configured to:

compute, by an incoming call score computing subsystem of the contact feature score computing subsystem, the incoming call score at each specified interval by dividing a count of the one or more incoming calls received from the first one or more users during a specified interval cumulative one or more incoming calls received from the first one or more users throughout a day;

compute, by a first user call preference score computing subsystem of the contact feature score computing subsystem, the first user call preference score by determining a percentage of the one or more incoming calls received from the first one or more users out of a total of the one or more incoming calls and the one or more incoming emails for each specified interval of the first one or more users;

compute, by a call productive rate score computing subsystem of the contact feature score computing subsystem, the call productive rate score by dividing a count of the one or more outgoing calls reaching productivity call criteria by a total number of the one or more outgoing calls, wherein the productivity call criteria is associated with at least one of: a duration of one or more conversation calls between the first one or more users and the second one or more users exceeds at least a predetermined length of time and the one or more conversation calls is supported by one or more system-recorded notes comprising relevant actions, wherein the predetermined length of time comprises at least one of: 5 seconds and 10 seconds;

compute, by a quarterly call productivity score computing subsystem of the contact feature score computing subsystem, the quarterly call productivity score by:
  computing one or more individual call productive rate scores from one or more productive communications between the first one or more users and the second one or more users, occurred at a plurality of times of each day throughout the quarter time period;
  aggregating the one or more individual call productive rate scores; and
  dividing the aggregated one or more individual call productive rate scores by a total count of the one or more individual call productive rate scores to compute the quarterly call productivity score; and computing, by a second user call preference score computing subsystem of the contact feature score computing subsystem, the second user call preference score by:
  aggregating second one or more individual call productive rate scores associated with each user of the second one or more users occupied in the call activities with the first one or more users within a specified interval; and
  dividing the aggregated second one or more individual call productive rate scores by a total count of the second one or more users occupied in the call activities with the first one or more users during the specified interval, to compute the second user call preference score.

14. The machine-learning based (ML-based) computing system of claim 10, wherein in computing the one or more first user call scores for each specified interval of the contact prediction window based on the one or more contact feature scores, the first user call score computing subsystem is configured to:
  assign the determined one or more weightages to the one or more contact feature scores; and
  aggregate the assigned one or more weightages to the one or more contact feature scores to compute the one or more first user call scores for each specified interval of the contact prediction window.

15. The machine-learning based (ML-based) computing system of claim 10, wherein the one or more loss functions comprising at least one of: mean squared error and mean absolute error wherein the learning rate is determined at a time of training the machine learning model, and wherein the learning rate is a hyperparameter in a context of one or more gradient descent rules for training the machine learning model.

16. The machine-learning based (ML-based) computing system of claim 15, wherein the training subsystem is further configured to validate the machine learning model based on one or more validation datasets, and
  wherein in validating the machine learning model comprises determining whether the machine learning model is trained until the one or more losses reaches a stable state indicating the achieved convergence.

17. The machine-learning based (ML-based) computing system of claim 10, wherein the training subsystem is further to re-train the machine learning model over a plurality of time intervals based on one or more training data, wherein in re-training the machine learning model over the plurality of time intervals comprises:
  receiving the one or more training data associated with at least one of: the one or more optimal contact times and the prioritized list of the one or more optimal contact times, from the output subsystem;
  adding the one or more training data with the one or more training datasets to generate one or more updated training datasets comprising at least one of: first one or more data points and second one or more data points;
  re-training the machine learning model to update the one or more weightages by performing the process of at least one of: the performance of the forward passes, the computation of the gradient of one or more losses, updating of the one or more initial weightages, until convergence is achieved; and
  executing the re-trained machine learning model in the first user call score computing subsystem to compute the one or more first user call scores for each specified interval of the contact prediction window over the plurality of time intervals.

18. The machine-learning based (ML-based) computing system of claim 10, wherein the one or more data associated with the first one or more users and the second one or more users, are extracted from the one or more databases based on one or more techniques comprising at least one of: data normalization, data anonymization, data aggregation, data analysis, and data storage; and
  wherein the one or more databases comprises at least one of: one or more relational databases, one or more object-oriented databases, one or more data warehouses, and one or more cloud-based databases.

19. A non-transitory computer-readable storage medium having instructions stored therein that when executed by a hardware processor, cause the processor to execute operations of:
  receiving one or more inputs from a second one or more users, wherein the one or more inputs comprise information related to at least one of: one or more entities associated with a first one or more users and a contact prediction window is associated with a predefined time duration during which the second one or more users requires an optimal instance for a communication with the first one or more users;
  extracting one or more data associated with the first one or more users and the second one or more users from one or more databases, based on the one or more inputs received from the second one or more users;
  computing one or more contact feature scores based on the extracted one or more data associated with the first one or more users and the second one or more users, for each specified interval of the contact prediction window, wherein the one or more contact feature scores comprises at least one of: incoming call score at each specified interval, first user call preference score, call productive rate score, quarterly call productivity score, and second user call preference score;

training and executing a machine learning model to determine one or more weightages of each contact feature score of the one or more contact feature scores for one or more parameters of the machine learning model, wherein the machine learning model comprises a gradient descent based machine learning model trained by:

receiving one or more training datasets associated with the one or more contact feature scores, from a contact feature score computing subsystem;

performing forward passes with one or more initial weightages by processing one or more training datasets associated with the one or more contact feature scores, through the machine learning model to compute the one or more first user call scores for each specified interval of the contact prediction window;

executing one or more loss functions to determine a difference between the computed one or more first user call scores and actual one or more first user call scores;

computing gradient of one or more losses for the one or more initial weightages of each contact feature score of the one or more contact feature scores;

updating the one or more initial weightages of each contact feature score of the one or more contact feature scores based on the gradient of one or more losses and a learning rate; and repeating a process of at least of: performance of the forward passes, the computation of the gradient of one or more losses, updating of the one or more initial weightages, until convergence is achieved, wherein the convergence is achieved when the one or more losses is reduced;

computing one or more first user call scores for each specified interval of the contact prediction window based on the one or more contact feature scores for each specified interval of the contact prediction window, using the one or more weightages of each contact feature score determined by the machine learning model;

computing at least one of: one or more optimal contact times and a prioritized list of the one or more optimal contact times by ranking each specified interval of the contact prediction window associated with the one or more first user call scores, wherein each specified interval comprises at least one of: 30 minutes, one-hour, and two-hours;

providing an output of at least one of: the one or more optimal contact times and the prioritized list of the one or more optimal contact times to the second one or more users on an user interface associated with one or more electronic devices; and communicating with the first one or more users by scheduling one or more calls with the first one or more users during the one or more optimal contact times.

20. The non-transitory computer-readable storage medium of claim 19, wherein computing the one or more first user call scores for each specified interval of the contact prediction window based on the one or more contact feature scores, comprises:

assigning the determined one or more weightages to the one or more contact feature scores; and aggregating the assigned one or more weightages to the one or more contact feature scores to compute the one or more first user call scores for each specified interval of the contact prediction window.

* * * * *